United States Patent [19]

Weaver, Jr.

[11] Patent Number: 4,548,696
[45] Date of Patent: Oct. 22, 1985

[54] 3,4-DISUBSTITUTED POLYPYRROLES AND ARTICLES OF MANUFACTURE COATED THEREWITH

[75] Inventor: Otha G. Weaver, Jr., Travelers Rest, S.C.

[73] Assignee: Olin Corporation, Pisgah Forest, N.C.

[21] Appl. No.: 671,780

[22] Filed: Nov. 15, 1984

[51] Int. Cl.[4] .................. C25B 11/00; C25B 3/02
[52] U.S. Cl. .................. 204/290 R; 204/59 R; 204/78; 136/256; 429/111; 528/423
[58] Field of Search .................. 204/59 R, 72, 290 R, 204/78; 528/423; 136/256; 429/111

[56] References Cited

U.S. PATENT DOCUMENTS 3,574,072  4/1971  Louvar .................. 204/72
4,487,667 12/1984  Traynor .................. 204/59 R

OTHER PUBLICATIONS

Diaz et al., Ext. Linear Chain Compd., 1983, 3, pp. 417-441, Ed. Miller et al., N.Y., N.Y.
Street et al., (IBM Res. Lab., San Jose, CA.—Tech. Report No. 13, Off. of Naval Res. Apr. 7, 1983.
Fleiderman et al., Khim. Geterotsikl, Soedin, 1973, (8) 1146 (Russ.) (C.A. 79: 126202s).
Fleiderman et al., Zh. Obsheh, Khim. 1975, 45(i), 197020 (Russ.) (C.A. 82: 170565y).
Diaz, Electrochemistry (1981) (C.A. 95: 194383g).
Salmon et al., ACS Symp. Ser. (1982) (C.A. 97: 92932j).
Diaz et al., J. Electroanal. Chem. Interfacial Electrochem. (1982) (C.A. 96: 181943k).
Diaz et al., J. Electroanal. Chem. Interfacial Electrochem. (1981) (C.A. 96: 42996s).
Kanazawa et al., J. Chem. Soc. Chem. Commun. (1979) (C.A. 92: 111403c).

Primary Examiner—John F. Niebling
Attorney, Agent, or Firm—Kerkam, Stowell, Kondracki and Clarke

[57] ABSTRACT

Electrically conducting and non-conducting 3,4-disubstituted polypyrroles of the formulae:

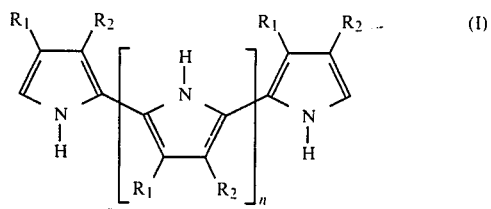

wherein:
n is a positive integer greater than 4;
$R_1$ and $R_2$ may be the same or different, provided that (1) when $R_1$ and $R_2$ are different, one of $R_1$ and $R_2$ is $CH_3$ and the other of $R_1$ and $R_2$ is $-COOR_3$ or $-COCH_3$, wherein $R_3$ is $CH_3$, $C_2H_5$, $C_3H_7$ or $t-C_4H_9$; and (2) when $R_1$ and $R_2$ are the same they are $C_3H_7$, $C_4H_9$, $C_5H_{11}$ or $C_6H_{13}$;

and electrically conducting salts thereof having the formula:

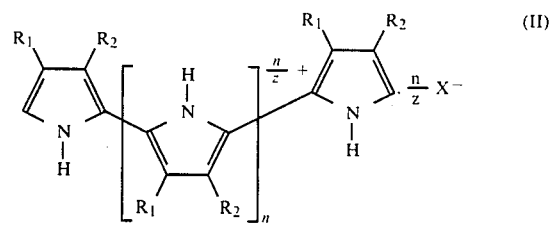

wherein:
n, $R_1$, $R_2$ and $R_3$ have the above meanings,
X is an anion, and
Z is a number from about 3 to about 4.

11 Claims, No Drawings

3,4-DISUBSTITUTED POLYPYRROLES AND ARTICLES OF MANUFACTURE COATED THEREWITH

BACKGROUND OF THE INVENTION

1. Field of the Invention

The present invention relates to certain electrically conducting polypyrroles.

2. Prior Art

Most of the known organic polymers are substantially electrically insulating, having conductivities at room temperature on the order of from about $10^{-10}$ ohm$^{-1}$.cm$^{-1}$ to about $10^{-18}$ ohm$^{-1}$.cm$^{-1}$. The desire for low-density, flexible, processible conductors generated considerable research for ways to improve the conductivity of known polymers or for new polymers having higher conductivities. Recently, new polymer systems, e.g., poly-p-phenylene, polypyrrole, polyaniline, poly-p-phenylene sulfide, poly(2,5-thienylene), fluoroaluminum, fluorogallium phthalocyanine, all having enhanced electrical conduction properties, have been designed.

Polypyrrole, a thermally stable polymer capable of being doped without using hazardous reagents is among the most desirable of these systems in that it may be prepared electrochemically [Dall'Olio et al V Compt. Pend. C 267, 433 (1968); Diaz et al, J. Chem. Soc. Chem. Commun. 635 (1979)]. This is advantageous in that the properties of the electrochemically prepared film may be altered by merely controllably varying the electrolysis conditions, i.e., nature of the electrolyte or solvent, current density, electrode potential, etc. Although the electrochemical polymerization results in the formation of the polymer in the oxidized or conducting form, the film can be prepared for removal in either the conducting or insulating form.

The electrochemical polymerization method also enables the production of derivatized polypyrroles by polymerizing substituted polypyrroles [Diaz et al, Ext. Linear Chain Compd., 1983, 3, 417–441, Ed. Miller et al, N.Y., N.Y.; Street et al (IBM Res. Lab., San Jose, CA.), Office of Naval Research, Technical Report No. 13, 4/7/83, pp. 1–17; Fleiderman et al, Khim, Geterotsikl. Soedin, 1973, (8), 1146 (Russ.) (C.A. 79: 126202s); Fleiderman et al, Zh. Obsheh, Khim. 1975, 45(i), 197–20 (Russ.) (C.A. 82: 170565y); Diaz Chem. SCR 1981, 17 (1-5), 145-8 (C.A. 95: 194383g); Salmon et al, ACS Symp. Ser. 1982, 65-70 (C.A. 97: 92932j); Diaz et al, J. Electroanal. Chem. Interfacial Electrochem. 1982, 33(2), 233-9 (C.A. 96: 181943k); Diaz et al, J. Electroanal. Chem. Interfacial Electrochem., 1981, 129 (1-2), 115-32 (C.A. 96: 42996s); Kanazauva et al, J. Chem. Soc. Chem. Commun. 1979, (19), 854-5 (C.A. 92: 11403 C)]. Among the polypyrrole derivatives prepared to date are poly-N-alkylpyrroles, poly-N-phenylpyrroles, poly-N-(p-tolyl)pyrroles, poly-N-methylpyrrole-pyrrole copolymers, poly-3,4-dimethylpyrrole, poly-3,4-diphenylpyrrole and poly-3-methylpyrrole.

The beta-substituted (i.e., 3 and/or 4-substituted) polypyrroles are particularly advantageous in that substitution in the 3- and/or 4-position(s) results in increased chain order in that the beta-substituents ensure exclusively alpha-alpha linkages between the pyrrole rings of the polymer.

It is an object of the present invention to provide certain novel electrically conducting 3,4-disubstituted polypyrroles having unexpected advantageous properties and coating compositions containing the polypyrroles as well as substrates coated therewith.

SUMMARY OF THE INVENTION

The above and other objects are realized by the present invention which provides novel non-conducting neutral 3,4-disubstituted polypyrroles having the formula:

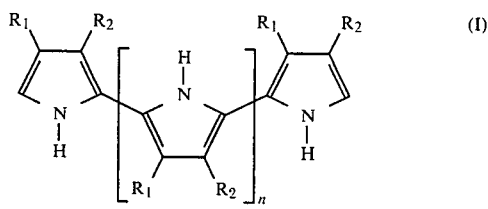

wherein:
n is a positive integer greater than 4;
$R_1$ and $R_2$ may be the same or different, provided that
(1) when $R_1$ and $R_2$ are different, one of $R_1$ and $R_2$ is $CH_3$ and the other of $R_1$ and $R_2$ is —$COOR_3$ or —$COCH_3$, wherein $R_3$ is $CH_3$, $C_2H_5$, $C_3H_7$ or t-$C_4H_9$; and (2) when $R_1$ and $R_2$ are the same they are $C_3H_7$, $C_4H_9$, $C_5H_{11}$ or $C_6H_{13}$;

and electrically conducting salts thereof having the formula:

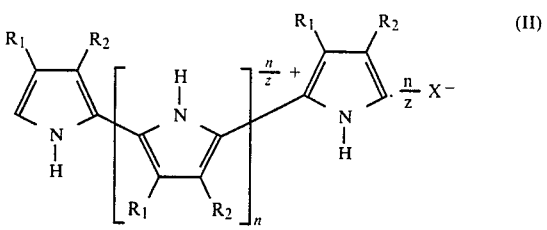

wherein:
n, $R_1$, $R_2$ and $R_3$ have the above meanings,
X is an anion, and
Z is a number from about 3 to about 4.

DETAILED DESCRIPTION OF THE INVENTION

The preferred polypyrroles of the present invention are those of the above formulae I and II wherein $R_1$ and $R_2$ are both n-butyl or n-pentyl. The most preferred is poly-3,4-dipentylpyrrole.

The preferred 3,4-disubstituted polypyrroles of the present invention are advantageous, compared with known 3- and/or 4-substituted polypyrroles in that they are highly soluble in a wide variety of organic solvents, making them highly versatile coating materials. Moreover, films comprising the preferred polypyrroles of the invention have increased flexibility at elevated temperatures as compared with known polypyrrole films. It has also been found that films cast from organic solvent solutions of the preferred polypyrroles are more pliable and impact resistant than those comprising known polypyrroles. Surprisingly, films cast from the preferred polypyrroles exhibit adhesive properties which enhance the versatility thereof.

The neutral polypyrroles of the invention are substantially electrically non-conducting whereas the salts thereof are electrically conducting. The above-noted preferred polypyrrole salts are highly electrically conductive. The remaining polypyrrole salts are less conductive and share the above-listed advantages over known polypyrroles to a lesser degree but are, nevertheless, highly useful as semiconductive plastics.

In formulas (I) and (II) above n is a positive integer greater than 4 and connotes the degree of polymerization of the polypyrrole. The precise value of n will depend, of course, upon the conditions of polymerization and the identity and nature of the starting monomer.

In formula (II), which represents the class of salts of polypyrroles comprising one aspect of the invention, z is a number representing the average number of repeating units in the polymeric chain bearing a positive charge and associated with each anion. It will be understood by those skilled in the art that the exact value of z will depend in each case upon the identity and nature of the repeating unit and the particular anion forming the salt. The total positive charge of the cationic portion of the salt, therefore, is represented by n/z which, of course, is equal to the total number of anions associated therewith.

For example, where the anion is $ClO_4^-$, the value of z is about 4 whereas for $BF_4^-$, the value of z is about 3.

Those skilled in the art, having been exposed to the principles of the invention, will be able to identify the values of n and z in any particular case without undue experimentation or the exercise of inventive faculties.

The polypyrroles of the present invention have conductivities at room temperature between $2.6 \times 10^{-5}$ and $1.8 \times 10^{-4}$ (ohm·cm)$^{-1}$ with only a slight loss in conductivity over several months. All may be prepared as air-stable, flexible films by conventional electrochemical polymerization methods. All are thermally stable; however, the preferred polypyrroles, i.e., poly(3,4-dibutylpyrrole) and poly(3,4-dipentylpyrrole), soften and are slightly pliable at temperatures approaching 130° C.

Moreover, the preferred polymers are relatively highly soluble in a wide variety of solvents (e.g., methylene chloride, methanol, ethanol, acetonitrile, pyridine, etc.) and minimally soluble in acetone and dimethyl formamide. The solubility of the preferred polypyrroles can be enhanced by recovering the polymers from solutions thereof and thoroughly drying the recovered polymers. Moreover, films can be prepared from solutions of the thus recovered polypyrroles which have electrical conductivities at least equal to those of the presolubilized polymers. The films cast from the solutions of the dibutyl and dipentyl substituted polypyrroles are blue-black and opaque and have surface appearances varying from smooth and glossy to rough and flat blue-black depending upon the solvent employed, the solution concentration, and polymerization conditions.

The polypyrrole films of the invention find application as electrically conductive protection films for substrates such as electrodes, e.g., in solar cells, wherein electron exchange through the film is necessary.

The ability to switch the films between the neutral (non-conducting) and oxidized (conductive) states enables the use of the films on electrode surfaces for reactions in aprotic solvents which are selective to certain ranges of redox potentials.

Films of the polypyrroles of the present invention also find use as electrodes for general electrochemical use. The ability to chemically modify the polymer chain (e.g., by the electrochemical doping method disclosed in U.S. Pat. No. 4,321,114) enables the skilled artisan to tailor the polymer for specific electrochemical applications.

The present invention includes articles of manufacture comprising substrates coated with films of the above-described polypyrroles. The substrate may comprise an electrically conducting surface coating with the film according to conventional electrochemical polymerization procedures or articles coated by conventional solvent casting techniques from organic solvent solutions of the polymer, followed by drying.

By electrochemical polymerization is meant an electrolysis procedure whereby pyrrole monomer in an electrolyte is oxidized at an electrode to produce an unstable $\pi$-radical cation which then reacts with neighboring pyrrole species to form an oxidized polypyrrole film on the electrode surface. The anion in the oxidized, electrically conducting polymer film is provided directly by the electrolyte. The film is conducting as electrochemically grown and contains electrolyte anions that balance the cationic charge on the polymer.

The polymer can be converted repeatedly between the neutral, non-conducting form and the oxidized, conducting form by the method, described by G. B. Street et al, J. Polymer Science, Polymer Preprints, Vol. 23, No. 1, p. 117 (1982). See also Diaz et al [J. Chem. Soc. Chem. Commun. 397, 417 (1980)]. Briefly, the electrochemical switching is achieved under redox conditions wherein ions are moved into and out of the film. The electrochemical properties of a particular polypyrrole film are, of course, dependent upon the identity of $R_1$, $R_2$ and $R_3$, but are also dependent upon the nature and identity of the anion (X).

The selection of an anion will depend upon the intended application of the polypyrrole prepared therefrom. Suitable anions include, but are not limited to, $I^-$, $Br^-$, $Cl^-$, $F^-$, $PF_6^-$, $AsF_6^-$, $BCl_4^-$, $BF_4^-$, $CH_3CO_2^-$, $CH_3C_6H_4SO_3^-$, $SO_4^{--}$, $ClO_4^-$, $HSO_4^-$, $CF_3SO_3^-$, $CF_3COO^-$, $HC_2O_4$, etc. Those skilled in the art, having been exposed to the principles of the invention will be able to select a particular anion without resort to either undue experimentation or the exercise of inventive faculties.

Films prepared from the polypyrroles of the invention have a variety of uses, e.g., protective coating for anodes of solar cells, photoelectrodes, etc., as well as those described by Dall'Olio et al, Street et al and Diaz et al, supra.

The invention is illustrated by the following non-limiting examples.

EXAMPLE 1

The electrochemical synthesis of films of poly(methyl-3-methyl-4-pyrrolecarboxylate), I, poly(3-acetyl-4-methylpyrrole), II, poly(3,4-diethylpyrrole), III, poly(3,4-dibutylpyrrole), IV, and poly(3,4-dipentylpyrrole), V, were accomplished using a one-compartment cell consisting of a 1" by 3" sheet of platinum foil as the anode and a gold wire wrapped 1" by 3" microscope slide as the cathode. The electrolysis medium consisted of 99% aqueous deoxygenated acetonitrile, 0.1M tetraethylammonium tetrafluoroborate or tetrabutylammonium perchlorate and 0.03–0.1M of the desired monomer. The cell was placed in a dry box under nitrogen and the electrodes attached to a potentiostat/galvanostat. The cell was placed under galvanostic control and the current density set between 0.5–1.4 mA/cm$^2$ depending on the monomer and the electrolyte as shown in Table I. The time was also varied from 30 minutes to several hours depending on the thickness of the film desired. After the allotted time, the polymer coated platinum electrode was removed, washed with water, dried, and removed from the electrode as a film or powder. The powdered material was compressed into a pellet under 35 tons of pressure and the electrical conductivity measured by the four-point probe method using osmium probes spaced 0.06 inches apart.

The use of the perchlorate ion tends to give slightly higher conductivities than the tetrafluoroborate and requires lower current densities for polymerization.

The thermal properties of the polymers were examined by thermal gravimetric analysis (TGA) and differential scanning calorimetry (DSC). The TGA's and DSC's of polymers I, II and III indicate that decomposition of these three polymers takes place before any softening or melting occurs. However, polymers IV and V soften and are slightly pliable at temperatures approaching 130° C.

TABLE 1

| Monomer | Ion | Decomposition Temp., °C. | Current | Conductivity ohm$^{-1}$ · cm$^{-1}$ |
|---|---|---|---|---|
| I | BF$_4$ | 200 | 1.43 | $1.8 \times 10^{-4}$ |
| I | ClO$_4$ | 175 | 1.14 | $4.3 \times 10^{-4}$ |
| II | BF$_4$ | 230 | 1.37 | $2.6 \times 10^{-5}$ |
| III | ClO$_4$ | 185 | 0.5 | $1.2 \times 10^{-3}$ |
| IV | ClO$_4$ | 190 | 0.5 | $7.6 \times 10^{-5}$ |
| V | ClO$_4$ | 170 | 0.5 | $1.8 \times 10^{-4}$ |
| Pyrrole | BF$_4$ | 250 | 1.0 | 100 |

EXAMPLE 2

The oxidized, conducting films prepared according to Example 1 may be electrochemically converted to the neutral, non-conducting state according to the following procedure.

Into a one compartment cell containing 0.1M tetrabutylammonium perchlorate in dry, oxygen free, acetonitrile was placed a gold wire wrapped 1″ by 3″ microscope slide (counter electrode), a 1″ by 1″ strip of poly-3,4-dipentylpyrrole (working electrode), and a reference electrode. The electrodes were connected to a potentiostat and a constant potential of 2.5 V was applied to the cell. The time was varied from 30 minutes to several hours depending on the degree of neutralization required. For a reaction time of 2.5 hours the pyrrole conductivity dropped to 1/16th of its original value. During this time the pyrrole changed color from blue/black to a bronze color. Continued neutralization under these conditions resulted in a polymer with a conductivity less than $10^{-10}$ ohm$^{-1}$ cm$^{-1}$.

EXAMPLE 3

Films of the polypyrroles of the invention may be prepared according to the following procedures.

A. A 12% solution of poly-3,4-dibutylpyrrole (from Example 1) in pyridine was placed in the trough of a blade film applicator. The doctor blade was set for a film thickness of 0.10 mm. The applicator was then manually moved smoothly down a glass plate. The resulting wet film was allowed to air dry to afford a 0.09 mm thick coating of poly-3,4-dibutylpyrrole.

B. A 10% solution of poly-3,4-dibutylpyrrole (from Example 1) in methylene chloride was prepared and a clean glass rod was slowly lowered into the solution.

The rod was then slowly withdrawn and air dried to give a thin coating of poly-3,4-dibutylpyrrole. The coated rod may be recoated to obtain the desired thickness.

I claim:

1. An electrically non-conducting 3,4-disubstituted polypyrrole having the formula:

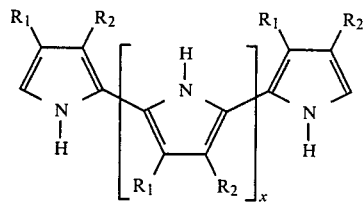

wherein:

x is a positive integer greater than 4;

R$_1$ and R$_2$ may be the same or different, provided that (1) when R$_1$ and R$_2$ are different, one or R$_1$ and R$_2$ is CH$_3$ and the other of R$_1$ and R$_2$ is —COOR$_3$ or —COCH$_3$, wherein R$_3$ is CH$_3$, C$_2$H$_5$, C$_3$H$_7$ or t-C$_7$H$_9$ and (2) when R$_1$ and R$_2$ are the same they are C$_4$H$_9$, C$_5$H$_{11}$ or C$_6$H$_{13}$ or an electrically conducting salt thereof having the formula:

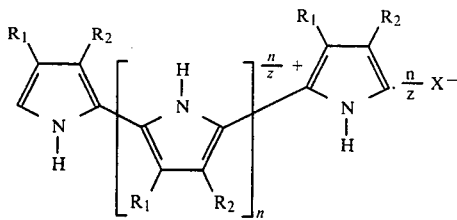

wherein:

n, R$_1$, R$_2$ and R$_3$ have the above meanings,

X is an anion, and

Z is a number from about 3 to about 4.

2. A polypyrrole of claim 1 wherein one of R$_1$ and R$_2$ is CH$_3$ and the other of R$_1$ and R$_2$ is —COOR$_3$.

3. A polypyrrole of claim 2 wherein R$_3$ is CH$_3$.

4. A polypyrrole of claim 1 wherein one of R$_1$ and R$_2$ is CH$_3$ and the other of R$_1$ and R$_2$ is —COCH$_3$.

5. A polypyrrole of claim 1 wherein R$_1$ and R$_2$ are C$_4$H$_9$.

6. A polypyrrole of claim 1 wherein R$_1$ and R$_2$ are C$_5$H$_{11}$.

7. A polypyrrole of claim 1 wherein R$_1$ and R$_2$ are C$_6$H$_{13}$.

8. An article of manufacture comprising a substrate coated with a polymer film comprising a polypyrrole of claim 1.

9. The article of claim 8 wherein said substrate is an electrically conductive surface and said polymer film is coated thereon by electrochemical polymerization utilizing said substrate as an electrode therein.

10. The article of claim 8 wherein said polymer film is coated on said substrate by solvent casting.

11. An organic solvent solution of a polypyrrole of claim 1.

* * * * *